(12) United States Patent
Yamauchi et al.

(10) Patent No.: US 6,496,464 B1
(45) Date of Patent: Dec. 17, 2002

(54) DISK DRIVE APPARATUS

(75) Inventors: Yoshiaki Yamauchi, Minori (JP); Hisahiro Miki, Chigasaki (JP); Seiji Hamaie, Hitachinaka (JP); Tomoki Hirata, Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/517,593

(22) Filed: Mar. 3, 2000

(30) Foreign Application Priority Data

Mar. 5, 1999 (JP) .............................................. 11-58059

(51) Int. Cl.$^7$ ............................................... G11B 33/02
(52) U.S. Cl. ..................................................... 369/77.1
(58) Field of Search ............................... 369/77.1, 75.2, 369/75.1

(56) References Cited

U.S. PATENT DOCUMENTS 5,793,729 A * 8/1998 Soga et al. ................. 369/77.1
5,844,874 A * 12/1998 Saito et al. ................. 369/75.2
5,930,218 A * 7/1999 Mitsui et al. ............... 369/75.2
6,122,240 A * 9/2000 Kim .......................... 369/77.1

* cited by examiner

Primary Examiner—Hoa T. Nguyen
Assistant Examiner—Jennifer M. Dolan
(74) Attorney, Agent, or Firm—Antonelli, Terry, Stout & Kraus, LLP

(57) ABSTRACT

A disk drive apparatus is provided in which there is a disk tray having a disk-receiving face shaped in the form of a circular groove for mounting a recording disk thereon. The disk tray has a plurality of disk holding parts for holding a recording disk onto the disk-receiving face. A disk loading mechanism provides for loading/unloading the disk tray in/out of the apparatus, and a disk position regulator is placed near the disk tray to position the disk when the disk tray is loaded/unloaded. The regulator has a contact surface contacting a part of the rim of a recording disk protruding out of the sides the disk tray.

8 Claims, 8 Drawing Sheets

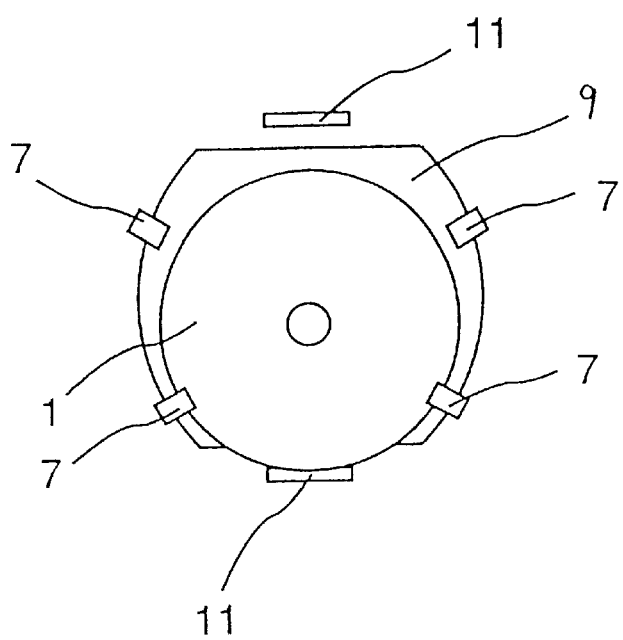
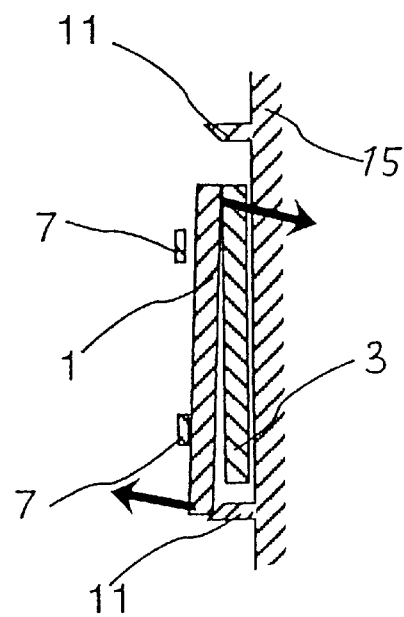
FIG. 5(a)
FIG. 5(b)

DISK DRIVE APPARATUS

BACKGROUND OF THE INVENTION

The present invention relates to a disk drive apparatus that carries out information retrieval only, or both the retrieving and recording of information, on a rotating disk recording medium. More particularly, this invention relates to a loading mechanism for disk drive apparatuses, such as a CD-ROM, a DVD-ROM, and a DVD-RAM that uses an apparatus in which the recording medium is arranged vertically.

It is known that disk drive apparatuses of the desktop type, such as CD-ROM or DVD drives, are typically mounted horizontally. To set up a disk drive apparatus with a horizontal disposition is to set up the disk drive apparatus so that the rotating axis extends vertically.

In describing a conventional disk drive apparatus, the disk loading of an apparatus which is oriented vertically is not considered in the description provided in the Japanese Patent Unexamined Publication No. 10-21677, which relates to disk loading mechanism for a disk drive apparatus which sets up horizontally.

Especially, to prevent a disk from falling out of the mechanism at the time of disk loading, there is a disk drive apparatus for a desktop, which has only disk guide parts like a claw for preventing the disk from falling out, which parts are equipped on the periphery of the disk-receiving face on a disk tray. The disk-receiving face has a circular groove or recess in which a disk is mounted. The disk falling out refers to a disk coming off of the disk-receiving face of the disk tray. In the prior mechanism, the overlapping between the disk and the disk guides can not be increased due to the limitation of the size of the disk-receiving face relative to the external diameter of the disk. Therefore, it can be said that such prior mechanisms were not very effective in providing stable disk loading.

If the overlapping part is small, the disk may be damaged by falling out, when the user inserts the disk into the disk tray. And, the disk may also be damaged by contact between the disk and internal parts of the apparatus, if the disk falls out of the disk tray when the disk is loaded into the apparatus under the condition described above. In addition, error chucking may occur under the condition described above, when the disk is chucked to the spindle motor. As mentioned above, there may occur a problem in that disk loading cannot be stably carried out, if the disk is loaded with a vertical orientation and held on the disk tray with the disk guide only.

SUMMARY OF THE INVENTION

The object of this invention is to prevent the generation of the above-mentioned problem, so as to carry out stable disk loading.

A disk drive apparatus according to this invention is characterized by a disk tray having a disk-receiving face shaped in the form of a circular groove or recess for mounting a recording disk thereon, and having a plurality of disk holding parts for holding a recording disk onto said disk-receiving face, a disk loading mechanism for loading/unloading said disk tray in/out of the apparatus, and a disk position regulator placed near said disk tray when said disk tray is loaded/unloaded, and having a contact surface contacting a part of a rim of the recording disk, which contact surface faces in a direction toward which an opposite side of the rim of the recording disk, relative to the part of the rim of the recording disk by contacted said contact surface, is pushed to said disk-receiving face.

The contact surface of the regulator may be made to be slope or curved surface. The regulator may be placed at a position in which it contacts the recording disk when the recording disk is loaded with the disk L@y into the apparatus.

Still further advantages of the present invention will become apparent to those of ordinarily skill in the art upon reading and understanding the following detailed description of the preferred and alternate embodiments.

BRIEF DESCRIPTION OF THE DRAWINGS

The invention will be described in conjunction with certain drawings which are for the purpose of illustration of preferred and alternate embodiments of the invention only, and not for the purposes of limiting the same, and wherein:

FIG. 5(a) is a top view and FIG. 5(b) is a sectional view showing a relationship between a disk and the composition of a disk drive apparatus in an embodiment of this invention.

DESCRIPTION OF THE PREFERRED EMBODIMENTS

Figure 1:
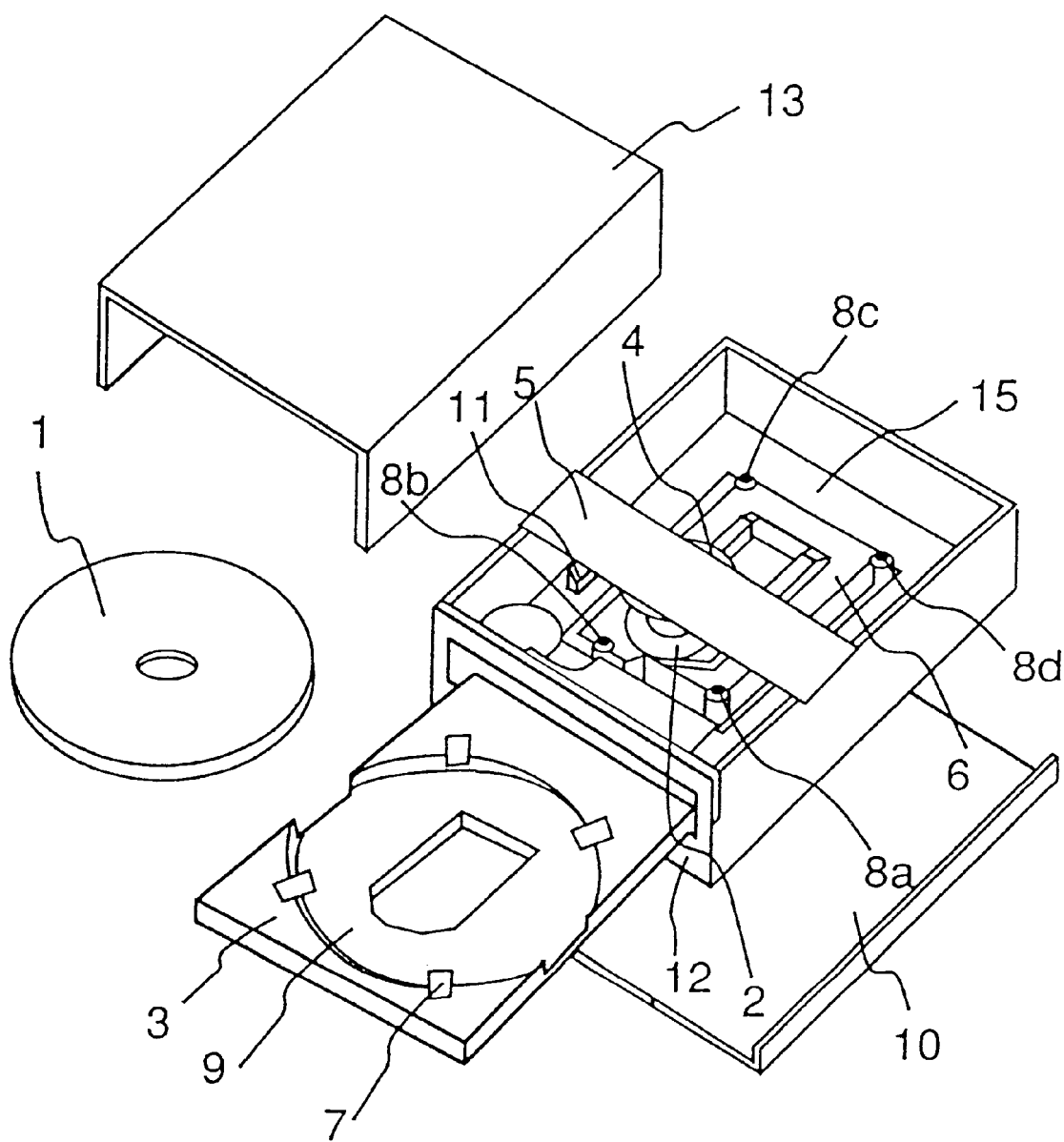
FIG. 1 is a perspective view of a disk drive apparatus forming an embodiment of this invention.

A preferred embodiment of the present invention will be explained with reference to FIG. 1

The disk drive apparatus of the present invention has a mechanism base 15 on which there is mounted a loading mechanism to convey a disk 1 into the apparatus (or, to convey the disk 1 out of the apparatus), a mechanism for driving the disk 1 and a mechanism for retrieving or recording information depending on the medium. The mechanism base 15 is installed in a housing having a bottom cover 10 and a top cover 13 and which is formed so as to be able to be installed into equipment, like a computer.

The disk drive apparatus has a disk tray 3 for guiding or conveying the disk 1 in an out of a tray-window, which is formed in the front panel 12 of the apparatus, in response to operation of a loading mechanism, as will be described later. Disk tray 3 is provided with a disk-receiving face 9 that forms a concave recess of round shape for mounting the disk 1 thereon. A plurality of disk guides 7 are provided on the boundary between the concave recess formed by the disk-receiving face 9 and surface of disk tray surrounding disk-receiving face 9. Disk guides 7 are each formed like a claw to prevent the disk 1 from falling out of disk tray 3. The relation at the time of mounting disk 1 on disk tray 3 between each disk guide 7 and the disk 1 will be described later.

Disk 1 is taken in the apparatus by the loading mechanism while being carried on disk tray 3, after the user puts the disk 1 on the disk tray 3. Once inside of the apparatus, the disk 1 is fixed on a turntable (not illustrated) of a spindle motor 2 by a disk clamper 4 installed in a clamping holder 5. This disk clamper 4 also may be provided directly on the top cover 13, thereby eliminating the need for the clamping holder 5. After disk 1 is fixed, it is rotated by spindle motor 2 at the prescribed speed.

An optical head is provided in a unit mechanism chassis 6 that is not illustrated in detail. By using this optical head, the disk drive apparatus can read data recorded in disk 1, or write data to the disk. A head drive mechanism is provided to transfer the head along a radius direction of the disk 1. The spindle motor 2 and head drive mechanism are provided in the unit mechanism chassis 6, which is mounted through insulators 8a–d (made from an elastic body) on mechanism base 15. The insulators 8a–d dampen vibration and any impact which may be transmitted to the unit mechanism chassis 6 from outside of the apparatus.

The loading mechanism will be explained with reference to FIG. 2, which is a top view of a unit mechanism and a loading mechanism with the top cover 13 of the disk drive apparatus removed and the unloading disk tray 3 extended. The unit mechanism is a structure including elements installed in unit mechanism chassis 6, such as a spindle motor 2 and an optical head drive mechanism, etc. The loading mechanism is a conveying mechanism for effecting in and out movement of disk tray 3.

The disk loading mechanism for conveying disk tray 3 uses the driving force of drive motor 21 to move the disk tray 3 in and out. This drive motor 21 is positioned by a mounting pin (which is not illustrated) on the mechanism base 15, and the drive motor 21 is secured by at least one caulking structure provided on mechanism base 15. At the tip of the rotating shaft of the drive motor 21, a worm gear 22 is provided. The turning effort of drive motor 21 is transmitted from the worm gear 22 to primary wheel gear 23 rotatably mounted on mechanism base 15. Primary wheel gear 23 rotates a rotating shaft on which a second wheel gear 24 is mounted. Namely, the driving force of drive motor 21 is transmitted from the rotating worm gear 22 to the second wheel gear 24 via primary wheel gear 23. On disk tray 3, a tray rack 25 is integratedly mounted in a straight line along the direction of tray movement. The driving force of the drive motor 21 is transmitted to the tray rack 25 which engages with the second wheel gear 24. These gears which transmit the turning effort of the drive motor as a driving force in a straight line direction to the disk tray are called a transmission gear arrangement. Disk tray 3 can be operated in the direction of the arrow shown in the FIG. 2 by normal rotation and reverse rotation of the rotating shaft of drive motor 21. The disk tray 3 is supported by a tray feed guide 26 on both sides (the right side and the left side of the disk tray 3 in FIG. 2) in the apparatus, so that the disk tray 3 is guided through a linear movement through tray feed guide 26 in and out of the mechanism.

On mechanism base 15, there are provided two detectors 29 for judging whether in and out movement of disk tray 3 is finished. Detector 29 adjacent the front panel 12 detects when the outward movement of disk tray 3 is completed. Detector 29 in the back of the mechanism base 15 detects when inward movement of disk tray 3 is completed. Detectors 29 may be provided as a switch which part of the disk tray 3 contacts directly when movement of the disk tray 3 into and out of the apparatus is completed, or they may be provided in the form of a photodetector to provide for noncontact detection. Instead of such detectors 29, it is also possible to judge that movement of the disk tray 3 is completed by whether the drive motor has rotated a predetermined number of times by detecting the number of revolutions of the drive motor. Emplacement completion detection part 51 judges completion of inward movement of disk tray 3 according to a signal received from the detectors 29. Movement completion detection part 53 judges completion of outward movement of disk tray 3. Controller 52 controls operation of disk tray drive motor control circuit 54, and drive motor 21 is controlled based on the judgment result of movement completion detection part 53 and emplacement completion detection part 51. Controller 52 starts the measurement of the time when disk tray 3 starts the disk loading in response to the carrier order, and controls the drive motor 21.

The disk drive apparatus of this invention may be used with a horizontal disposition or a vertical disposition. In the vertical condition, the side of the apparatus (right or left side when the panel 12 faces the front) is arranged to form an underside of the mechanism. A disk drive apparatus according to one embodiment of this invention solves the problem of poor quality, e.g. on loading, on chucking, or improper positioning of the disk 1, during the process from carrying disk 1 mounted on disk tray 3 into the apparatus to disk chucking which installs disk 1 on spindle motor 2, when the disk drive apparatus is used with a vertical disposition. In this embodiment, disk guides 7 (claw for holding disk 1 on disk tray 3) are provided on the peripheral part of the disk-receiving face 9 (circular groove) of disk tray 3, and a disk position regulating part 11 for controlling the disk position on loading the disk is provided in the mechanism base 15.

Figure 3A:
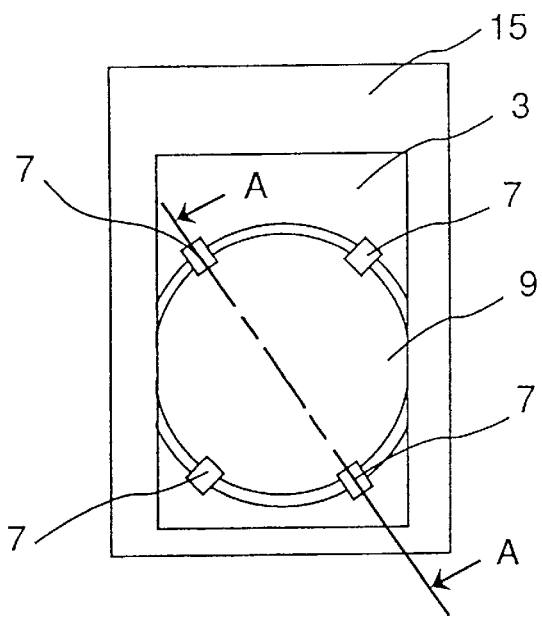
FIG. 3(a) is a top view and FIGS. 3(b) and 3(c) are section views of a disk tray and a mechanism base, respectively, of a disk drive apparatus in the prior art.
Figure 3B:
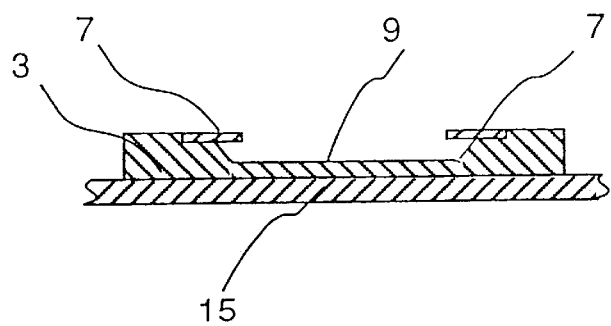
Figure 3C:
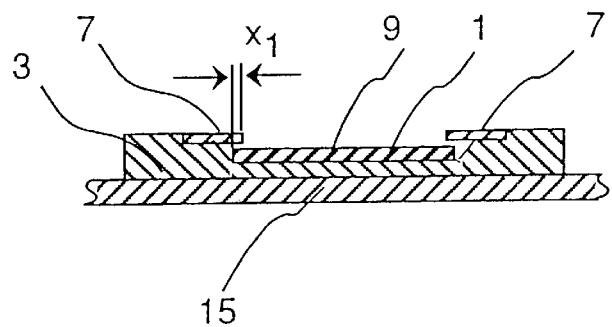

In the following, one embodiment of this invention will be explained in more detail with reference to FIGS. 3(a) to 3(c), which show mechanism base 15 and disk tray 3 in a prior art disk drive apparatus. FIG. 3(a) is a top view of the disk drive apparatus, and FIG. 3(b) is a sectional view taken on line A—A in FIG. 3(a). FIG. 3(c) is a cross section view taken on line A—A of disk tray 3 with the disk 1 mounted thereon. The shape of the disk-receiving face 9 of disk tray 3 is a circle which forms a recess for mounting the disk 1. The shape of the base of this circular recess is a little larger than the external diameter of the disk 1, and the side of this circular recess is inclined to facilitate the mounting and removal of disk 1. Disk guides 7 of claw shape are provided on the disk tray 3 to prevent the disk 1 from falling out of the disk tray 3 when arranged in the vertical condition. Disk guides 7 are holding parts which hold disk 1 at four spaced points.

Also, the disk tray has cut-out parts which form tangential slots on opposite sides of the circular recess of disk-receiving face 9 (refer to disk tray 3 of FIG. 1). The cut-out parts are provided according to the constraint of the dimensions of the apparatus, the external diameter of disk 1 and the dimension of the loading structure. As shown in FIG. 3(c), the overlap (x1) between disk guides 7 and the periphery of disk 1 is very small when disk 1 is mounted on disk tray 3 in the condition in which the apparatus is level. Therefore, in the condition in which the apparatus is vertical, a part of disk 1 will stick out of disk tray 3 through one of the cut-out parts provided on opposite sides of the disk-receiving face 9, and disk guides 7 which are located on the other side of the cut-out part through which the disk 1 protrudes do not overlap with disk 1. Thus, problems may occur, e.g. to remove disk 1 from disk tray 3, damage to the disk may occur from the contact with other parts on loading/unloading the disk 1, and a chucking error may occur on chucking disk 1 to spindle motor 2. On the other hand, it is difficult to further extend the disk guides 7 above disk 1 toward the center of disk 1, because of the possibility that it will not be possible to insert disk 1 in disk tray 3 if the disk guides 7 extend too far beyond the edge of disk 1.

Figure 4A:
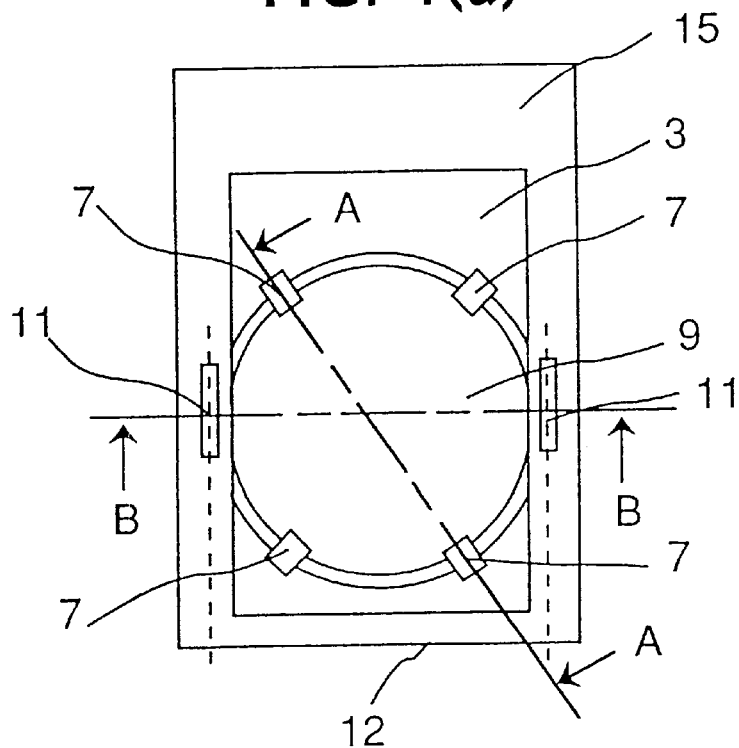
FIG. 4(a) is a top view and FIGS. 4(b) and 4(c) are sectional views of a disk tray and a mechanism base, respectively, of the disk drive apparatus representing an embodiment of this invention.
Figure 4B:
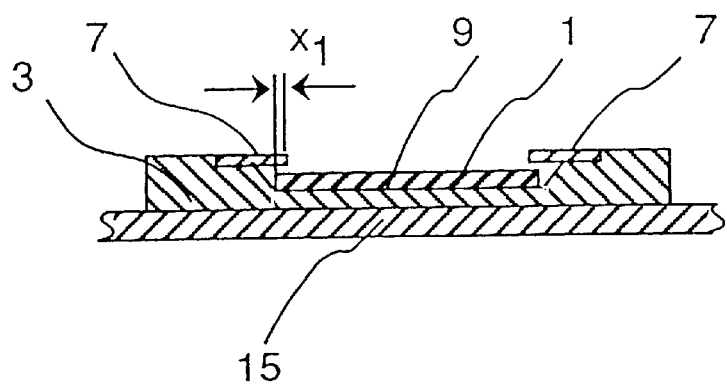
Figure 4C:
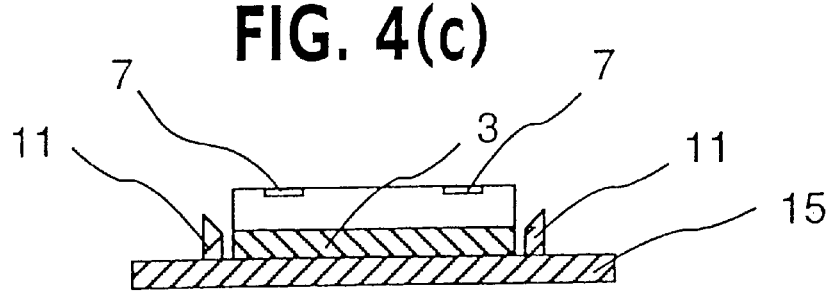

One embodiment of this invention that solves these problems will be explained with reference to FIGS. 4(a) to 4(c), which show the composition of mechanism base 15 and disk tray 3 in the disk drive apparatus of this invention. As seen in FIG. 4(a), the shape of disk tray 3 is the same as the construction shown in FIG. 3(a). However, in mechanism base 15, a disk position regulation part 11 (a position regulator) is provided for disk guide 7 of the disk tray 3 and disk-receiving face 9 when the disk drive apparatus is oriented vertically, which disk position regulation part 11 controls the position of disk 1. This disk position regulation part 11 may be provided on both sides, and it may be provided on disk tray 3 at a position in alignment with the position of spindle 2, as shown in FIG. 1. Further, the regulation part 11 may extend from the side of spindle motor 2 to the vicinity of front panel 12, as shown in FIG. 2. FIG. 4(a) is a view of the upper side of the disk drive apparatus. FIG. 4(b) is a view in section taken along the line A—A of FIG. 4(a), in which disk 1 is mounted on disk tray 3, and FIG. 4(c) is a view in section taken along the line B—B of FIG. 4(a), in which disk 1 is not mounted on disk tray 3.

In this embodiment of the present invention, the apparatus, when oriented vertically, makes the periphery of disk 1, which protruded from the cut-out part provided on one side of disk tray 3 (toward the gravity direction), contact the disk regulation part 11, so that the position of the other side of disk 1 is forced against disk tray 3. Disk position regulation part 11 may be provided on both right and left sides of disk tray 3, so that the apparatus may be set up vertically on either side. One case is when the right side of the apparatus is to be the base, and the other case is when the left side is to be the base. Of course, disk position regulator 11 may be provided only on one side in the gravity direction, if the installation direction is limited to one side. In FIG. 1 and FIG. 4(a), though the disk position regulation parts 11 are provided each as one part on the right side and the left side, they may be provided as plural parts along the path where the disk tray 3 is carried in the apparatus (on the dotted line shown in FIG. 1 and FIG. 4(a) extended from the disk position regulation part to the front panel 12 of mechanism base 15). And, as shown in FIG. 2, the disk position regulation parts 11 may be extended along the disk conveyance route.

With such a composition, disk position regulation part 11 will have the following effect. Though the overlap (x1) between the periphery of disk 1 and disk guides 7 is very small, disk position regulation part 11 can control the position of the disk 1 in the disk-receiving face 9 and disk guide 7 of disk tray 3, and it can prevent the disk from falling out, as well as avoid a chucking-miss and a loading-miss.

In FIG. 5(a), furthermore, an example of the action and effect of disk position regulation part 11 is illustrated. FIGS. 5(a) and 5(b) are views showing the action, effect, and the movement of disk 1 mounted on disk tray 3 in the disk drive apparatus, which is installed vertically (the apparatus is set up vertically). In FIG. 5(b), the example shows that the regulation part 11 in mechanism base 15 is provided at a position to chuck disk 1 to the turntable of spindle 2.

Disk-receiving face 9 provided in disk tray 3 has a sufficiently large diameter to accommodate the external diameter of disk 1, as shown in FIG. 5(a). Disk 1 moves downward (in the gravity direction) as shown in the figure, after disk 1 is mounted on disk tray 3. Disk 1 will stick out a little from disk-receiving face 9 (disk tray 3), since both sides of disk tray 3 are cut-out, as mentioned above. This protruding part of disk 1 contacts disk position regulation part 11, which controls the position of the disk and is provided on mechanism base 15 (fixed part in disk conveying) spaced from disk tray 3 (unfixed part in disk conveying). There is no restriction on the composition of disk position regulation part 11, so long as it is provided at a position that does not interfere with disk tray 3 on load/unloading of the disk 1.

The upper surface of disk position regulation part 11, which may contact disk 1, is inclined for moving disk 1 in the direction of the arrow shown in FIG. 5(b). Disk 1 is pressed against disk guide 7 (two of the disk guides 7 are provided (only one shown) in the lower part of FIG. 5(b)) as disk 1 slides away from disk tray 3 along this inclined surface, so that the other end part of disk 1 is pressed against disk tray 3. At this time, disk 1 can not come off the disk tray 3, as shown in FIG. 5(b), even if two disk guides 7 of the upper part do not contact the disk 1, as seen in FIG. 5(a). The position of disk 1 is fixed by contact with the disk guides 7, which act as a fulcrum. The disk drive apparatus makes it possible to load/unload disk 1 stably in this condition. The disk position regulation part 11 can place disk 1 in the prescribed position on chucking disk 1 to spindle motor 2, if it is placed in the position shown at least in FIG. 5(a). Therefore, it is possible to prevent an unexpected falling out of disk 1 from disk tray 3 on chucking of disk 1. It is possible to also prevent the unexpected falling out of disk 1 from disk tray 3 on loading/unloading of the disk 1, if disk position regulation part 11 is provided from the chucking position of disk 1 to near the front panel 12, as shown in FIG. 2. Disk 1 can rotate at a position not in contact with disk guides 7 and disk tray 3, after disk 1 is chucked to spindle motor 2.

The disk contact part of disk position regulation part 11 has been described as having an inclination; however, the invention is not limited to provision of an inclination. For example, the disk contact part may be formed to have a certain amount of curvature. Fundamentally, it may be possible to have disk 1 move to the transfer direction (the direction of the arrow in FIG. 5(b)). In addition, it is possible to obtain a larger effect by improving the sliding movement between disk 1 and the disk contact part of disk regulation part 11. More specifically, when the material of disk position 1 is a polycarbonate, considering the skid resistance, the surface of disk position regulation part 11 may be provided more smoothly. On the other hand, the surface of disk position regulation part 11 may have grease applied thereto to facilitate sliding. Furthermore, the material of disk position regulation part 11 may be made of a cognate resin material of disk 1.

It is desirable when the inclined part of disk position regulating part 11, as shown in FIG. 5(b), is formed from the part below disk-receiving face 9 of disk tray 3, and the tip of the inclined part is provided at the position where disk 1 does not stick out from disk guide 7. The interval between the tip of disk position regulation part 11 and a side of the disk guide 7 facing disk tray 3 may be made to be 1.2 mm or less, when the thickness of the disk 1 is 1.2 mm. Namely, based on the disk-receiving face 9 as criterion, the gap between the height of a side of disk guide 7 facing disk-receiving face 9 and the height of the tip of the regulation part 11 may be lower than the thickness of disk 1.

Figure 6A:
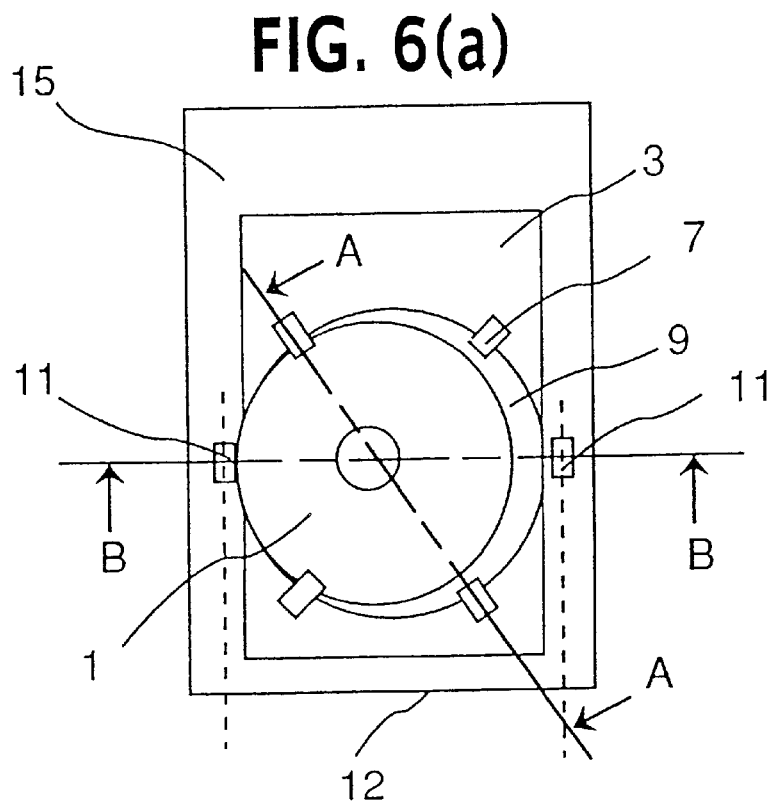
FIG. 6(a) is a top view and FIGS. 6(b) and 6(c) are sectional views showing movement of a disk in the disk tray in an embodiment of this invention.
Figure 6B:
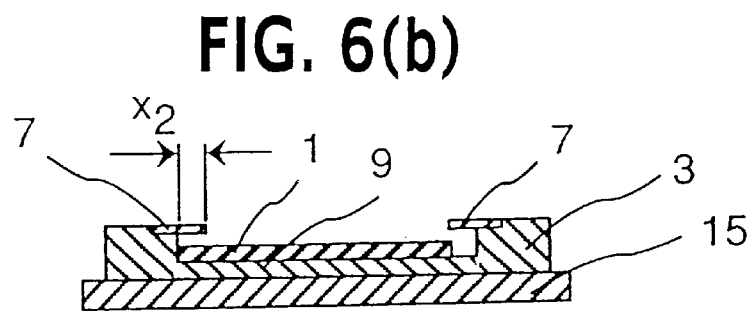
Figure 6C:
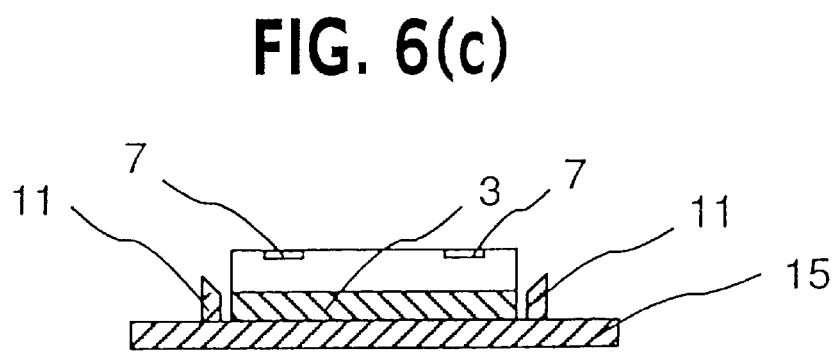

FIGS. 6(a) to 6(c) show the composition of mechanism base 15 and disk tray 3 in a disk drive apparatus of another embodiment of this invention. FIG. 6(a) is an upper view of disk tray 3 with disk 1 mounted thereon, and FIG. 6(b) is a cross sectional view taken on line A—A of FIG. 6(a) of the disk tray 3 with disk 1 mounted thereon. FIG. 6(c) is a sectional view taken on line B—B of FIG. 6(a) of disk tray 3 which does not have disk 1 mounted thereon.

Disk tray 3 has a disk-receiving face 9 in the shape of a circular recess for mounting disk 1 thereon. This disk-receiving face 9 has sufficiently larger outer dimensions than the outer dimensions of disk 1 and the circular recess has a depth sufficient to accommodate disk 1. The side wall of the circular recess is almost right-angled with chamfering on an upper part relative to a conventional inclination. The depth of the circular recess and the almost right-angled side of the base plane of the circular recess provide, respectively, for windage loss reduction of disk 1 during high-speed rotation or a noise reduction effect from around disk 1 during high-speed rotation of disk 1 simultaneously.

Since the disk 1 shifts in the gravity direction when the mechanism is vertically installed, when the diameter of disk-receiving face 9 of disk tray 3 is increased, it is possible for the disk guide 7 to greatly overlap (x2 in the FIG. 6(b)) the disk 1 to provide miss prevention of disk guide 7 with disk 1, as shown in FIG. 6(b). However, though it is possible lower disk guides 7 to greatly overlap in the gravity direction with disk 1 when disk 1 moves to the gravity direction side, the upper side of the disk is able to move freely without restriction by disk guides 7, as seen in FIG. 6(a).

Disk tray 3 has cut-out parts which form tangential slots on opposite sides of the circular groove of disk tray 3, as also provided in disk tray 3 of FIG. 1. These slots are provided from the viewpoint of a dimension restriction which relates to the width of the apparatus shown in FIG. 1, the external diameter of disk 1, and the loading structure. The outside dimension of disk 1 for a CD or DVD of 120 mm diameter has been standardized, and the tolerance of the diameter is allowed from −0.1 mm to +0.3 mm in the standards. Therefore, the disk 1 diameter becomes 120.3 mm, when the largest condition is assumed. In this case, the size of disk-receiving face 9 has a larger size by about 5 mm than the 120 mm diameter of disk 1. This is considered in setting the overlap between disk 1 and disk guide 7 in a vertical installation (setting up vertically) of an apparatus, as described above.

In this embodiment, disk regulation part 11 with an inclined surface is provided on mechanism base 15 near the cut-out part of disk tray 3. A respective regulation part 11 is provided on the right side and the left side of disk tray 3, so that the apparatus may be set up with a vertical orientation (on its right side, or, on its left side). Of course, a regulation part 11 may be provided only on one side in the gravity direction, if the installation direction is limited to one side.

Though the disk position regulation parts 11 are provided as one part on both the right side and left side in this embodiment, they may be provided as plural parts along the path where disk tray 3 is carried in the apparatus. And, as shown in FIG. 2, the disk regulation parts 11 may extend the full length along the disk conveyance route.

Another embodiment of this invention will be explained. Disk tray 3 provided in a disk drive apparatus according to this invention is supported on both sides (right and left side of disk tray 3) by tray feed guide 26 for movement into the apparatus, as shown FIG. 2. Disk tray 3 is moved while tray feed guide parts 26 are maintained in contact with disk tray 3 on conveying. The contact condition between disk tray 3 and tray feed guides 26 are in point to point contact with each in practice, not in a plane with each other. Therefore, the on disk tray 3 may have a tendency to bend in response to a moment force if the driving force of disk tray 3 shifts from center of gravity of disk tray 3. In this case, since disk tray 3 does not move smoothly, disk 1 mounted on disk tray 3 may fall out, or disk 1 may be contacted and damaged by parts in the disk drive apparatus. And, problems may occur in which the loading of disk tray 3 is not completed in a predetermined time (described later) or the disk tray 3 does not move due to the load of the aforesaid contact condition.

Figure 7A:
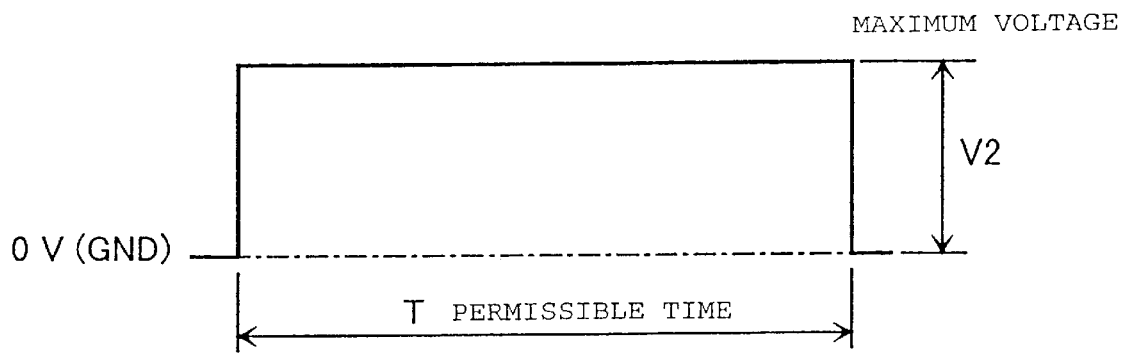
FIGS. 7(a) and 7(b) are diagrams showing driving voltage patterns in the prior art for conveyance of a disk tray.

FIG. 7(a) is a view showing a conventional pattern of the drive voltage supplied to drive motor 21 for moving the disk tray 3. For example, the maximum voltage supplied for the loading operation is V2 and the permissible time to complete the loading is T. Here, the maximum voltage is the allowable voltage available from the source voltage in use, and the permissible time is the time during which the user in general does not sense a discomfort in the operation of the disk drive apparatus. This time period is within about 3 seconds in the typical disk drive apparatus. FIG. 7(a) shows the voltage pattern in case of supplying the maximum voltage V2 to drive motor 21 by the disk loading command. In FIG. 7(a), although the voltage is supplied until the permissible time T has expired, the voltage is lowered within the permissible time T when the loading is finished, and the operation is finished.

Figure 7B:
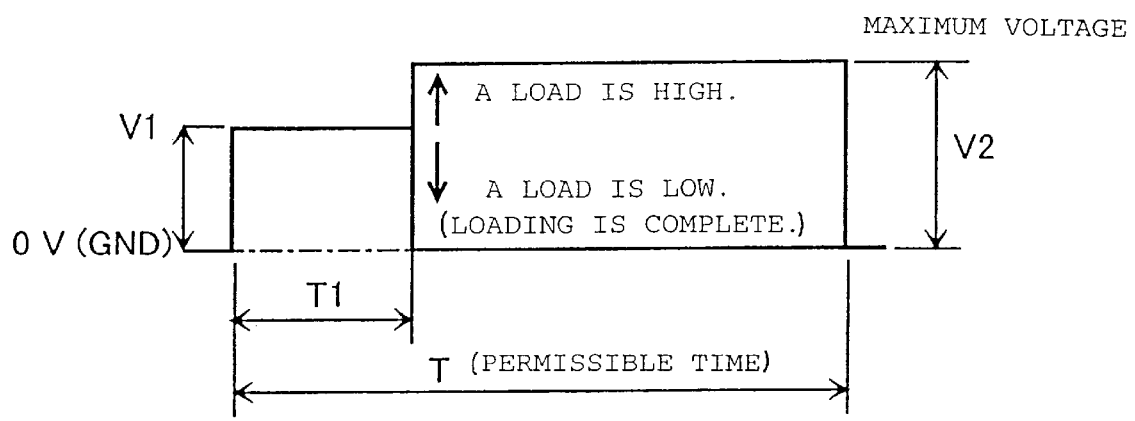

The pattern in FIG. 7(b) shows supplying a voltage V1 which is lower than the maximum voltage by the disk loading command. In this case, it is possible to decrease the power consumption, if the load in the operation of disk tray 3 is small. After voltage V1 is supplied, the voltage is lowered to 0V(GND) if the disk loading is finished within the time T1. If the load of the disk loading is high, the voltage is raised to the maximum voltage V2. However, even when using such drive voltage patterns, disk tray 3 may not move in the worst case, when friction or binding by other parts outside disk tray 3 or tray feed guide 26 occur.

Figure 8A:
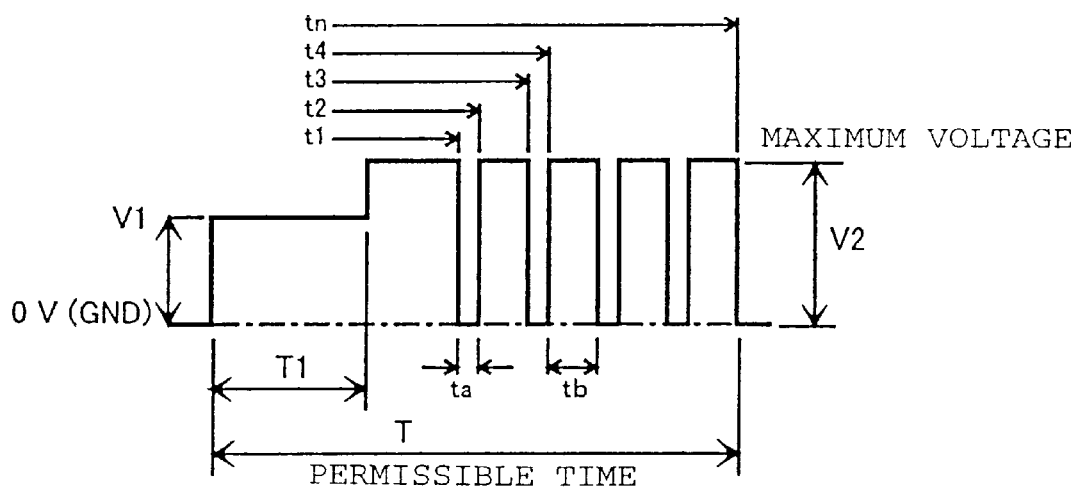
FIGS. 8(a), 8(b) and 8(c) are driving voltage patterns relating to another embodiment of this invention and showing conveyance of a disk tray.
Figure 8B:
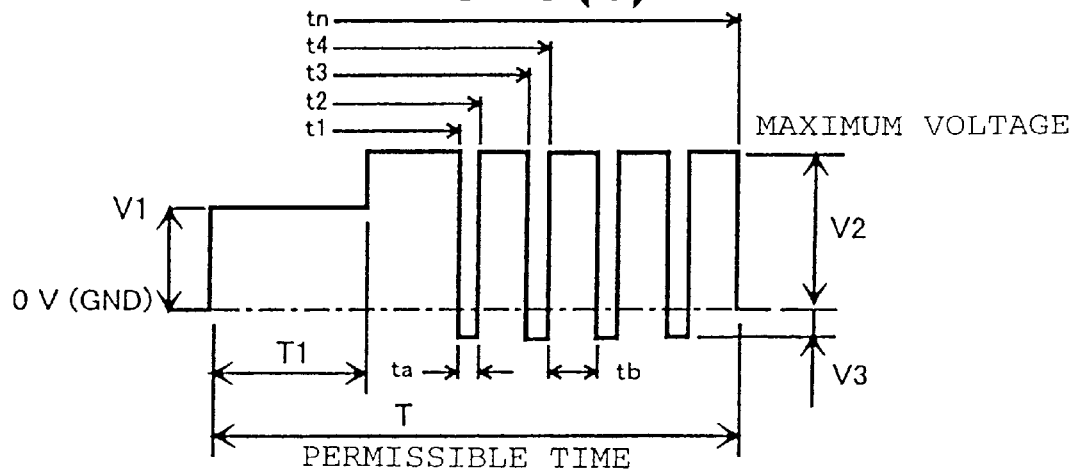
Figure 8C:
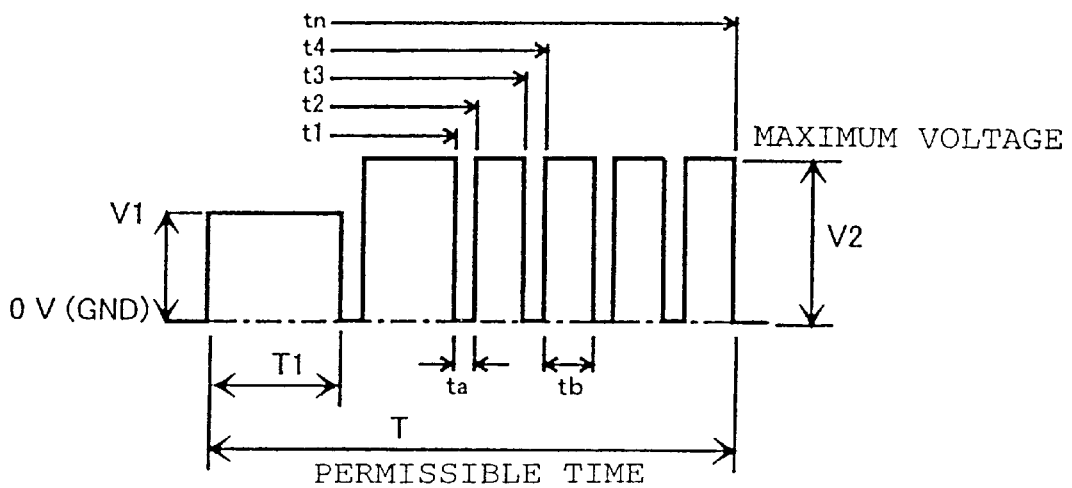

FIGS. 8(a) to 8(c) show drive voltage patterns of voltage supplied to drive motor 21 on conveying disk tray 3 in other embodiments of this invention, which are directed to solving the above-mentioned problem. The permissible time T and the maximum drive voltage V2 until loading completion, as illustrated in FIG. 7(b), are made to represent the same conditions. The drive voltage pattern of FIG. 8(a) is used to drive motor 21 at a voltage V1 that is lower than the maximum voltage V2 in response to the disk loading command. The voltage is lowered to 0V(GND) if the disk loading is finished within the time T1, as provided in FIG. 7(b). If the load of the disk loading is high, then the disk loading is not completed and the voltage is raised to the Maximum voltage V2. These commands are sent from controller 52 shown in FIG. 2. Controller 52 in this embodiment starts the time measurement when the command for disk loading starts, and watches always to determine whether the disk loading is finished or not, or whether the disk loading is still being carried out within a predetermined time or not. The next command is sent in response to such situations to drive motor control circuit 54.

In the above-mentioned condition, there is a case in which the load applied to disk tray 3 is very high, and the disk tray doesn't move though the torque of drive motor 21 is increased by a prescribed value of torque. This case is the case in which disk tray 3 can not be moved by the torque of drive motor 21, as determined by the controller 52, which watches to determine whether the disk loading is completed within a predetermined time or not. In this case, the maximum voltage V2 is supplied again, after the drive voltage is once lowered to 0V(GND) for a time ta, as seen in FIG. 8(a). The time ta may be the restoring time in so-called elastic deformation corresponding to the minute deformation of a contacting part (disk tray 3, tray feed guide 26, and other contacting part) which has caused the problem, so that the torque of drive motor 21 is able to restore movement. In this embodiment, although the time tb of supply of the maximum voltage V2 is constant, the time tb in the repeated voltage supply periods may be changed a little. The voltage 0V and the maximum voltage V2 may be repeated within permissible time T, when disk tray 3 can not be moved due to the load applied to disk tray 3 even in this condition.

Figure 2:
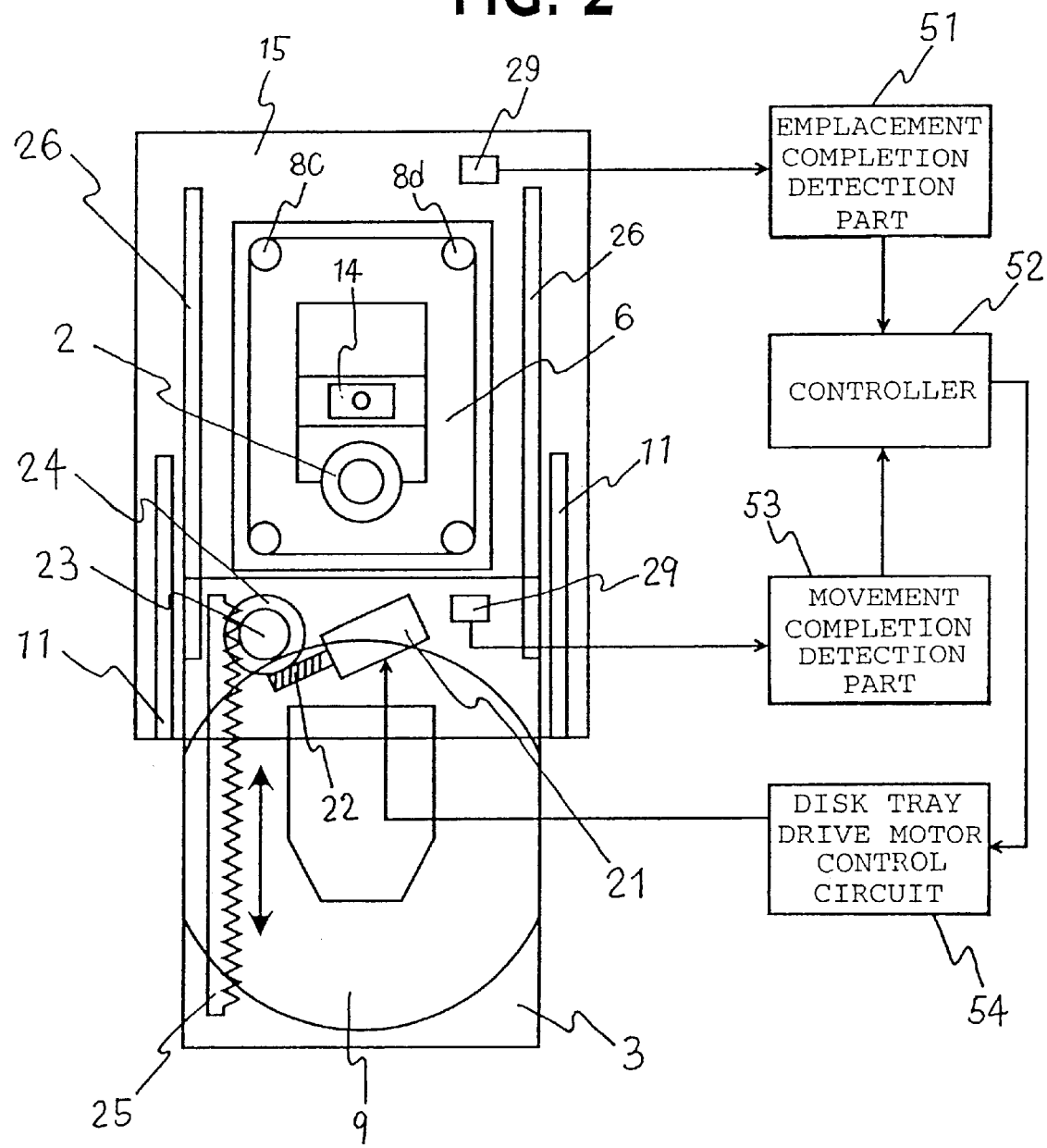
FIG. 2 is a top view of the disk drive apparatus showing disk loading according this invention.

After disk loading is completed, as shown in FIG. 2, controller 52 directs the operation of disk tray drive motor control circuit 54, and drive motor 21 is controlled based on the judgment results of movement completion detection part 53 and emplacement completion detection part 51. Here, although the maximum voltage and 0V(GND) are described as V2 and 0V(GND), they are mt limited in these examples. For instance, the maximum voltage may be a lower value than V2, and 0V(GND) may be a lower voltage.

It is possible to move the disk tray 3 stably by applying an intermittent voltage, as mentioned above, even if a large load is encountered on account of friction or binding etc. between the disk tray 3 and other parts. To change static friction to dynamic friction as a physical phenomenon at the contact part, the driving force applied to start movement is reduced by intermittently applying the drive voltage. In this way, it is possible to stabilize the conveying movement of disk tray 3 and to shorten the loading completion time in the limited range of drive voltage by applying this drive voltage pattern.

FIG. 8(b) shows a drive voltage pattern of the voltage supplied to drive motor 21 for moving disk tray 3 according to another embodiment of this invention. Drive motor 21 is initially supplied with a voltage V1 that is lower than the maximum voltage V2 based on the loading command. As shown in FIG. 7(a), if the disk loading is finished within the time T1, the voltage is lowered to 0V(GND), and if the load applied disk tray 3 is high, the voltage is raised to the maximum voltage V2. In the above-mentioned condition, there is a case in which the load applied to disk tray 3 is high relative to the torque of drive motor 21, namely, disk tray 3 can not move in response to the torque of drive motor 21. In this case, the maximum voltage V2 is supplied again, after the drive voltage is lowered to negative voltage V3 for a time period ta. The time ta may be the restoring time in so-called elastic deformation corresponding to the minute deformation of a contacting part (disk tray 3, tray feed guide 26, and other contacting part) which has caused the problem, so that the torque of drive motor 21 is able to restore movement. In this embodiment, although the time tb of supply of the maximum voltage V2 is constant, the time tb in the repeated voltage supply periods may be changed a little.

The negative voltage V3 and the maximum voltage V2 may be repeated within permissible time T, when disk tray 3 can not move due to the load applied to disk tray 3 even in this condition. When the load of disk tray 3 is high, it is possible to perfectly eliminate friction or binding etc. between disk tray 3 and other parts by applying the negative voltage intermittently. In addition, it is possible to stabilize the conveying movement of disk tray 3 and to shorten the loading completion time in the limited range of the drive voltage by applying the intermittent voltage shown in this embodiment, as well as the embodiment of FIG. 8(a).

FIG. 8(c) shows a drive voltage pattern of voltage supplied to drive motor 21 for moving disk tray 3 according to another embodiment of this invention. Drive motor 21 is supplied with a voltage V1 that is lower than the maximum voltage V2 based on the loading command. As shown in FIG. 8(a), if the disk loading is finished within the time T1, the voltage is lowered to 0V(GND), and if the load applied to disk tray 3 is high, the voltage is first lowered to 0V(GND), and after that the voltage is raised to the maximum voltage V2. Due to a change in the condition of the contact part, once the voltage is lowered, as shown in FIG. 8(a) and FIG. 8(b), if the disk loading is not finished under the maximum voltage V2 is applied, the voltage is lowered again. And, the voltage is raised to the maximum voltage V2 again after a constant time ta.

The time ta may be the restoring time in so-called elastic deformation corresponding to the minute deformation of contacting part (disk tray 3, tray feed guide 26, and other contacting part) which has caused the problem, so that the torque of drive motor 21 is able to restore movement. In this embodiment, although the time tb for supply of the maximum voltage V2 is constant, the time tb in the repeated voltage supply periods may be changed a little. The negative voltage V3 and maximum voltage V2 may be repeated within permissible time T, when disk tray 3 can not move due to the load applied to disk tray 3 even in this condition.

When the load of disk tray 3 is high, it is possible to perfectly eliminate friction or binding etc. between disk tray 3 and other parts by applying the negative voltage intermittently. In addition, it is possible to stabilize the conveying movement of disk tray 3 and to shorten the loading completion time in the limited range of the drive voltage by applying the intermittent voltage shown in this embodiment, as well as the embodiment of FIG. 8(a) or FIG. 8(b). The combination of embodiments shown in FIG. 8(b) and FIG. 8(c) also may be effective.

By the embodiments of this invention, it is possible to stably press the disk to the disk tray at the time of loading, and it is possible to prevent the disk from falling out of the disk tray, etc., when the disk drive apparatus has a vertical orientation. Therefore, it is possible to prevent damage to the disk due to contact with some parts in the disk drive apparatus and prevent the disk from falling out of the apparatus. And, it is effective to stably chuck the disk to a spindle motor in a disk drive apparatus, and to prevent chucking miss problem, etc.

The disk drive apparatus in accordance with this invention can prevent miss-loading of the disk, and so it is possible to offer a disk drive apparatus with a high reliability.

Also, the disk drive apparatus in accordance with this invention may be able to decrease the load (windage loss) on the disk during high-speed rotation, and to reduce electric power consumption of the spindle motor to rotate the disk, and to reduce the electric power consumption of the apparatus itself. In addition, it is effective for achieving noise reduction in the apparatus, since it also has the effect that the disk drive apparatus of this invention provides a reduction of the noise (the fluid sound) from around the disk due to the shape of the disk-receiving face of the disk tray.

What is claimed is:

1. A disk drive apparatus for a recording disk, comprising:
   a disk tray having a disk-receiving face shaped in the form of a circular groove and mounted a recording disk thereon, the disk tray having a plurality of disk holding parts for holding the recording disk onto said disk-receiving face;

a disk loading mechanism for moving said disk tray in/out of the apparatus; and a disk position regulator placed near the path of said disk tray when said disk tray is moved, said disk position regulator having a contact surface contacting one part of a rim of a recording disk which projects from said disk tray, said contact surface cooperating with at least one of said disk holding parts so as to push another part of the rim of said recording disk which is opposite to the one part of the rim contacting said disk position regulator to said disk-receiving face of said disk tray.

2. A disk drive apparatus according to claim 1, wherein said contact surface of said disk position regulator comprises a slope or curved surface extending from an upper edge which extends substantially parallel to the path of movement of said disk tray downwardly toward a lower edge which extends substantially parallel to the path of movement of said disk tray.

3. A disk drive apparatus according to claim 1, wherein plural disk position regulators are provided.

4. A disk drive apparatus according to claim 1, wherein said regulator is provided along said loading mechanism.

5. A disk drive apparatus according to claim 1, further comprising a spindle motor to rotate said recording disk, and fixing parts to fix said recording disk to said spindle motor, wherein said disk position regulator is provided at least at a position where said disk is fixed to said spindle motor.

6. A disk drive apparatus according to claim 1, wherein said contact surface of said disk position regulator has a height difference between the height of the top of said disk position regulator and the height of a lower portion of said disk holding parts with respect to said disk-receiving face which is less than the thickness of said recording disk.

7. A disk drive apparatus according to claim 1, wherein said disk position regulator is placed at a position where it contacts said recording disk that is loaded with said disk tray into the apparatus.

8. A disk drive apparatus according to claim 1, wherein said disk position regulator extends in a region from a front panel of the disk drive apparatus through which said disk tray moves to a position where said recording disk is fixed to a spindle motor for rotating said recording disk in the disk drive apparatus.

* * * * *